United States Patent [19]

Bergland et al.

[11] Patent Number: 5,317,658
[45] Date of Patent: May 31, 1994

[54] APPARATUS AND METHOD FOR PROVIDING A POLARIZATION INDEPENDENT OPTICAL SWITCH

[75] Inventors: Glenn D. Bergland, Berkeley Heights; John V. Camlet, Cranford; Saul J. Einbinder, Holmdel; Walter M. Pitio, Old Bridge; Robert C. Pritchard, Middletown; George J. Shevchuk, Old Bridge; Donald D. Shugard, Middletown, all of N.J.

[73] Assignee: AT&T Bell Laboratories, Murray Hill, N.J.

[21] Appl. No.: 864,293

[22] Filed: Apr. 6, 1992

[51] Int. Cl.$^5$ .............................................. G02B 6/26
[52] U.S. Cl. ..................................................... 385/16
[58] Field of Search ................. 385/16; 359/108, 117, 359/118, 127, 128, 139, 86, 42

[56] References Cited

U.S. PATENT DOCUMENTS

| | | | |
|---|---|---|---|
| 4,157,860 | 6/1979 | Marcatili | 385/16 X |
| 4,220,395 | 9/1980 | Wang et al. | 385/16 X |
| 4,291,939 | 9/1981 | Giallorenzi et al. | 385/16 X |
| 4,736,462 | 3/1986 | Joel, Jr. | 455/600 |
| 4,763,317 | 12/1985 | Lehman et al. | 370/58 |
| 4,878,726 | 11/1989 | Fatehi | 385/16 |
| 5,066,086 | 7/1990 | Angenent et al. | 385/41 |

OTHER PUBLICATIONS

"Lightwave Data Sheet" by AT&T Microelectronics, Inc. May 1990.

Primary Examiner—Akm E. Ullah
Attorney, Agent, or Firm—Samuel R. Williamson

[57] ABSTRACT

An apparatus and method are disclosed for implementing a polarization-independent optical switch wherein switchable communication signals are retained in the optical mode while being switched between optical links in an optical communication network. The polarization-independent optical switch comprises polarization-dependent components which are advantageously arranged to switch arbitrary polarized light waves. The polarization-independent optical switch is achieved by splitting incoming arbitrary polarized light waves into two paths, a light wave with a TE radiation component and a light wave with a TM radiation component. The light wave with the TE radiation component is converted to a light wave with a TM radiation component. Both light waves having the TM radiation component are then switched in a polarization-dependent photonic switch device. The arbitrary light waves are recovered from the optical switch by converting one of the switched light waves having the TM radiation component to a light wave having the TE radiation component. The light wave with this TE radiation component is combined with the remaining switched light wave having the TM radiation component in a polarization combiner. As the polarization of the input light waves vary, more or less of the light wave energy will pass through the first path of the optical switch or the second path of the optical switch. The total amount of light wave energy through the optical switch, however, will remain relative constant.

22 Claims, 1 Drawing Sheet

APPARATUS AND METHOD FOR PROVIDING A POLARIZATION INDEPENDENT OPTICAL SWITCH

BACKGROUND OF THE INVENTION

1. Technical Field

This invention relates to communication networks and more particularly, to a communication network that switches and transports information signals in the optical domain.

2. Description of the Prior Art

Optical transmission systems are becoming increasingly prevalent in modern telecommunication networks. They offer the advantages of a low cost high bandwidth transmission medium requiring amplification at relatively long spacing and support a very large number of simultaneous communications over each of the optical links that constitute the transmission medium. Voice, data, and video are communicated as digital signals over optic fibers to minimize noise and distortion of these signals over long distance transmissions.

Sources of optical signals and destinations for optical signals are interconnected via the optical links to intermediate photonic switches which time multiplex communication signals provided on these optical links. Each of these optical links comprises a pair of unidirectional transmission optical fibers connecting the sources and destinations with the photonic switches.

In order for the time multiplexed communication signals to be switched between optical links, it is necessary that the optical signals on the optical fibers either be converted to electrical form, switched in the electrical domain and then reconverted to optical signals, or be directly switchable from one optical fiber pair to another. The former is undesirable because it requires electrical signals corresponding to the optical signals to be generated and switched. This conversion process is inefficient because the inherently limited switching speeds in the electrical domain cannot provide full compatibility with the increased transmission speed of optical transmission mediums.

Photonic switches permit the direct switching of optical fibers from one optical fiber pair to another, albeit with some penalty in performance. It is well known that optical fibers, such as the single-mode type, widely employed in optical transmission systems do not maintain a polarization condition as initially provided thereto over a very long distance. Rather, the light waves that arrive at a destination usually do so in an arbitrary polarization condition. This polarization condition is determined by the polarization of two radiation components, TE and TM, in the light waves.

The TE component is known as the transverse electrical component of which the diagrammatic representation is a vector perpendicular to the direction of propagation of the radiation. The TM component is known as the transverse magnetic component of which the diagrammatic representation is a vector which is perpendicular to the direction of propagation of the radiation and orthogonal to the TE component. The coupling length in a single-mode fiber is different for each of the components TE and TM. Also the phase mismatch induced by the refractive index change in the fiber under the influence of an electric field depends to a very high degree on the initial polarization condition of the light waves which are propagated into the fiber. The TE and TM components of a light wave are described in *SINGLE-MODE FIBER OPTICS: Principles and Applications*, by Luc. B. Jeunhomme, Marcel Dekker, Inc., New York, 1983, pages 1 through 3.

In the operation of a photonic switch in an optical transmission system, all signals remain optical within the switch, and are not converted to electronic signals for the switching function. The switching function may be performed by either a polarization-independent photonic switch or a polarization-dependent photonic switch, with control of the switching function being provided by electrical control signals. The polarization-independent photonic switch will switch both radiation components TE and TM in a light wave polarized in an arbitrary polarization condition and route these components of the light wave to a proper output fiber. The polarization-dependent photonic switch, however, only switches the radiation component TM in a light wave polarized in an arbitrary condition.

Although the polarization-independent switch may switch both the TE and TM components of a light wave in an arbitrary polarized condition, it has the disadvantage of requiring a higher operating voltage than the polarization-dependent photonic switch. Moreover, the level of performance in each individual switch element in the polarization-independent photonic switch is inferior to that of the individual switch elements in the polarization-dependent photonic switch.

The limitation associated with the polarization-dependent photonic switch is that it only switches the TM component of a light wave polarized in an arbitrary condition. The TE component entering the switch will not be switched by the electrical control signals, and thus will not be routed to the proper output fiber. As a result, the polarization of the light wave entering the switch from the optical input fibers must be adjusted to the proper polarization by some type of polarization adjuster in order to use this polarization-dependent photonic switching device.

While switching of optical signals from one fiber to another may be achieved with the above described arrangements, it is nevertheless desirable to be able to switch optical signals from one optical fiber to another without first converting the optical signals into electrical signals, or without the disadvantages or limitations associated with polarization-independent and polarization-dependent photonic switches as they are currently employed in the art.

SUMMARY OF THE INVENTION

An apparatus and method for a polarization-independent optical switch is provided without the disadvantages or limitations usually associated with polarization-independent or polarization-dependent optical or photonic switches. In accordance with the invention, the polarization-independent optical switch comprises a polarization-dependent photonic switch device which is advantageously arranged to switch both the TM and the TE radiation components of arbitrary polarized light waves.

The polarization-independent optical switch is structured in preferred embodiments as follows. It comprises a polarizing splitter for receiving incoming arbitrary light waves and for splitting these light waves into two paths, a light wave with a TE radiation component and a light wave with a TM radiation component. The light wave with the TM radiation component is coupled directly to the photonic switch device via a high birefringence fiber which preserves this radiation component at the input of the photonic switch device. The light wave with the TE radiation component is also coupled to the photonic switch device via a high birefringence fiber, but this fiber is rotated 90 degrees before being connected to the photonic switch device. The rotation of this fiber changes the TE radiation component at its input end to a TM radiation component at its output end. The photonic switch device efficiently switches a light wave having just the TM radiation component. In the photonic switch device, the light waves of both TM radiation components are therefore efficiently routed to a pair of outputs on the switch device with both radiation components maintaining the same polarization that entered the switch device.

The polarization-independent optical switch also comprises a polarizing combiner in preferred embodiments for recombining the light waves from the photonic switch device. One of the light waves with the TM radiation component is coupled directly to the polarizing combiner via a high birefringence fiber, which presents the TM radiation component existing at the output of the photonic switch device. The other light wave with the TM radiation component also is coupled to the polarizing combiner via a high birefringence fiber. This fiber is rotated 90 degrees before being connected to the polarization combiner, however. The rotation of this fiber changes the TM radiation component at its input end to a TE radiation component at its output end. The polarizing combiner optically joins the two polarized light waves into arbitrary polarized output light waves with approximately the same light wave energy as the original input light waves. As the polarization of the incoming light waves vary, more or less of the light wave energy will pass through the first path of the photonic switch device or the second path of the photonic switch device. The total amount of light wave energy through the optical switch, however, will remain relative constant.

BRIEF DESCRIPTION OF THE DRAWING

This invention and its mode of operation will be more clearly understood from the following detailed description when read with the appended drawing in which.

DETAILED DESCRIPTION

Figure 1:
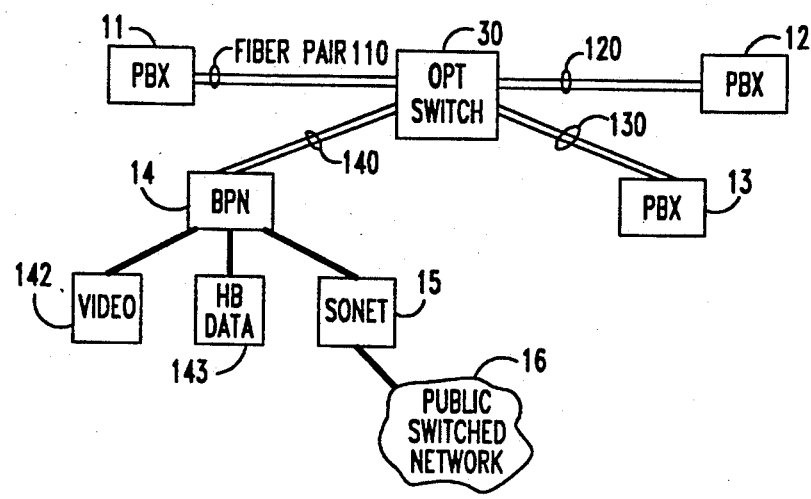
FIG. 1 is a general block diagram of a communication network comprising a plurality of private branch exchanges, a broad band port network and an optical switch.

Referring now to FIG. 1 of the drawing, there is shown a general block diagram of a communication network comprising a plurality of private branch exchanges (PBXs) 11, 12 and 13, a broad band port network (BPN) 14 and an optical switch 30. Each of the PBXs 11, 12 and 13 and the BPN 14 are respectively connected to the optical switch 30 via single-mode optical fiber pairs 110, 120, 130 and 140. Such an arrangement will be found, for example, in a campus environment with a small number of buildings, each building containing a PBX. The optical switch may be co-located in the same building as one of the PBXs or separately located as shown. Additional PBXs or BPNs may be added to the communication network as desired.

All communication traffic among the PBXs and the BPN is routed through the optical switch 30 which serves as a center stage switch. There is one transmit and one receiver fiber in the fiber pairs connecting each one of the PBXs 11, 12 and 13 and the BPN 14 to the optical switch 30. The traffic from one PBX, for example, PBX 11, may be routed to any of the other PBXs or to the BPN 14 by specifically configuring the optical switch 30.

There is no conversion of optical communication signals to electrical signals in the optical switch 30 for achieving the switching operation. Rather, the optical communication signals entering the optical switch 30 are switched directly from one fiber to another while remaining in the optical domain. This advantageous arrangement avoids the speed limitations that would exist if there were bit rate dependent components employed within the optical switch. Thus, once the optical switch 30 sets up a connection from one of its input ports to one of its output ports, the switch appears to the communication signals merely as a section of the fiber. With such an arrangement, the data rates among the PBXs and also the BPN 14 may evolve and migrate to higher bit rates over time without having to replace any components in the optical switch 30. The operation of the optical switch 30 is described in greater detail later herein with reference to both FIGS. 2 and 3.

Through the BPN 14, a number of communication signals requiring a large bandwidth may be routed into the communication network. For example, high bandwidth end points, such as illustratively shown both by video end point 142 and high bandwidth (HB) data end point 143, may be connected through the BPN 14 and the optical fiber 140 to the optical switch 30. Other high bandwidth end points within the network at any of the PBXs also may be routed through the optical switch 30. Communication traffic from various end points within the communication network also may be routed through a gateway or optical trunking system, such as the synchronous optical network (SONET) 15 to the public switch network 16. Thus, the high bandwidth end points in the communication network are provided access to the public switch network and to remote end points on other communication networks through the public switched network.

Figure 2:
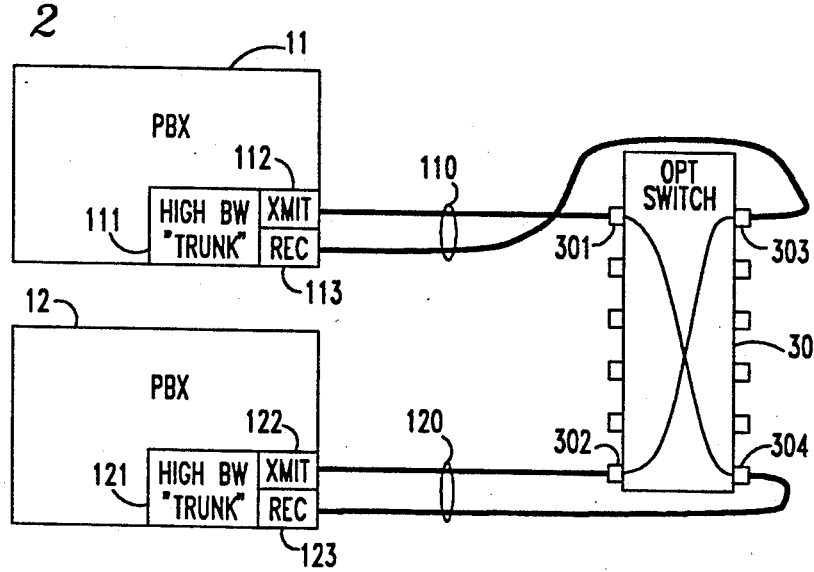
FIG. 2 is a block diagram of the private branch exchanges and the optical switch shown in FIG. 1.

Referring next to FIG. 2, there is shown in greater detail the PBXs 11 and 12 and the optical switch 30. Although not shown, the PBX 13 and the BPN 14 operate identical to PBXX 11 and 12 with regard to interfacing with the optical switch 30. Both PBX 11 and PBX 12 respectively perform a high bandwidth trunking function in trunk 111 and trunk 121. In performing this data collection function, each PBX collects many low bandwidth connections into a single bit stream that can be routed to another PBX. That trunk then performs a transmit/receive function that modulates and demodulates the bit stream into an appropriate form for the optical fiber in use. The outgoing bit stream undergoes an electrical to optical conversion in a transmitter, for example, transmitter 112 in PBX 11. In transmitter 112, a light source such as a laser (not shown) emitting a light wave at an appropriate wavelength is modulated with the outgoing bit stream being placed on the outgoing one of the fiber pair 110. The incoming bit stream undergoes an optical to electrical conversion in a receiver 113. In this receiver 113, the incoming bit stream on the incoming one of the fiber pair 110 is demodulated by an optical detector which then couples this signal to the trunk 111. Operation of the transmitter 122 and the receiver 123 in the PBX 12 is identical to that of like components in PBX 11.

The modulated light waves from the light source of transmitter 112 is coupled through the output one of the optical fiber pair 110 to an input port 301 on the optical switch 30. An output port 303 connects to the input one of the optical fiber pair 110 which, in turn, connects to the receiver 113 in the PBX 11. Similarly, the modulated light waves from the light source of transmitter 122 is coupled through the output one of the optical fiber pair 120 to an input port 302 on the optical switch 30. An output port 304 connects to the input one of the optical fiber pair 120 which, in turn, connects to the receiver 123 in the PBX 12. The result of these connections is that each PBX has a bidirectional connection through a fiber pair to the optical switch 30. Other input ports and output ports are available, as illustrated, on the optical switch 30 for accommodating additional fiber pairs from other PBXs or the BPN 14 shown in FIG. 1.

The optical switch 30 is configured by electrical control signals to connect a particular input port to a particular output port, usually in a symmetrical manner. Thus, for example, if an optical connection is desired between PBX 11 and PBX 12, as is illustrated in FIG. 2, the optical switch routes the signal on the fiber at input port 301 to the fiber at the output port 304. At the same time and for this connection, the optical switch routes the signal on the fiber at input port 302 to the fiber at the output port 303. In this manner, a bidirectional connection between PBX 11 and PBX 12 is achieved for a particular time or time slot.

Figure 3:
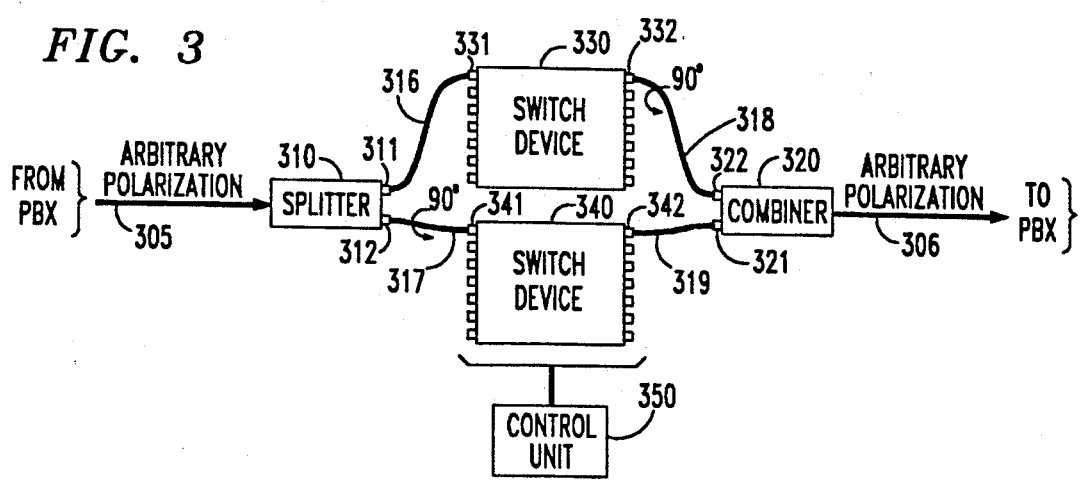
FIG. 3 is a block diagram of the components which comprise the optical switch shown in FIGS. 1 and 2, in accordance with the invention.

With reference to FIG. 3, there is shown the components which comprise the optical switch 30 shown in FIGS. 1 and 2. These components comprise, in accordance with the invention, a polarizing splitter 310, high birefringence fibers 316 through 319, polarization-dependent photonic switch devices 330 and 340, a polarizing combiner 320, and a control unit 350.

Arbitrary polarized light waves on a single-mode optical fiber 305 from one of the multiple PBXs, or the BPN 14 shown in FIG. 1, provide the input to the optical splitter 310. The lasers generally employed in the transmitters in each PBX produce single polarization light waves at their outputs. If these lasers could be connected directly to polarization-dependent switch devices, there would be no need to compensate for the arbitrary polarized light waves inputted to these devices. As the polarized light waves emitted by a laser propagates down a single-mode optical fiber, the single polarization is gradually distorted into arbitrary polarization due to effects such as the fiber moving or twisting, or due to temperature variations along the length of the fiber. Thus the light wave inputted on fiber 305 will not have the initially provided polarized condition when the PBX and the optical switch are some nominal distance apart. However the low transmission loss properties of single-mode optical fibers outweigh this disadvantage and these fibers are widely employed in optical transmission systems. A detailed discussion of single-mode optical fibers is provided in *SINGLE-MODE FIBER OPTICS-Principles and Applications* by Luc. B. Jeunhomme, Marcel Dekker, Inc., New York, 1983.

Each one of the input fibers providing an input to the optical switch 30, as illustratively shown by fiber 305, is connected to a polarizing splitter, such as splitter 310. This splitter splits all incoming light waves into two paths: all light waves with the TM component of radiation travels to a first output 311 of the splitter 310 where it is launched into the high birefringence fiber 316; and all light waves with the TE component of radiation travel to a second output 312 of the splitter where it is launched into the high birefringence fiber 317. A polarizing splitter (also usable as a polarizing combiner) suitable for use in this invention is available from Photonetics with Model No. AFOC-S or from JDS Fitel with Model No. PB100-3.

Switch devices 330 and 340 in the optical switch 30 are identical. Each one of these switch devices has an input and an output port for receiving communication signals associated with each one of the input fibers providing an input to the optical switch 30. Although shown as two devices, the functionality provided by these devices may be provided on a single device. Indeed, a low voltage 2×2 guided-wave electro-optic switch suitable for use as polarization-dependent switch devices 330 and 340, either singular or through configurations employing multiple combinations of this device, is available from AT&T Microelectronics, Inc. Such a device was disclosed by AT&T in a preliminary light wave data sheet released in May of 1990.

For ease of understanding the invention, only one optical path (fiber pair) comprising input fiber 305 and output fiber 306 are shown in FIG. 3 as connecting a PBX to the switch devices 330 and 340. Each one of other optical paths existing within the optical switch similarly employ input and output fibers, a splitter and a combiner, in accordance with the invention. Thus FIG. 3 illustrates only a single optical path through the optical switch 30 with all other optical paths through this switch being identical.

The control unit 350 simultaneously controls the switching of the communication signals in switch devices 330 and 340 from each input optical fiber to each output optical fiber in accordance with switching signals provided from each PBX and the BPN 14. The control signals to the control unit 350 from each PBX or the BPN 14 may be provided either over signaling fiber trunks or over signaling electrical trunks. Such arrangements are known and are further described in U.S. U.S. Pat. No. 4,736,462 issued to A. E. Joel, Jr. on Apr. 5, 1988 and U.S. Pat. No. 4,763,317 issued to H. R. Lehman, et al. on Aug. 9, 1988.

Unlike the single-mode optical fibers, the high birefringence fibers 316 through 319 preserve along their length the polarization of the light waves provided at their inputs. These polarization maintaining fibers thus preserve the polarization of the light waves in the state provided thereto at the first and second outputs 311 and 312 of the splitter 310. Such high birefringence fibers are available from York as Part No. HB-1250.

For proper operation, switch devices 330 and 340 must receive light waves with the proper polarization. These devices are most efficient in switching the TM component of a light wave. The fiber 316 carrying the light waves with the TM component of radiation is connected directly from the output port 311 of the splitter 310 to an input port 331 of the switch device 330. The fiber 317 carrying the light waves with the TE component of radiation is connected to the output port 312 of the splitter 310, then twisted or rotated 90° and connected to a corresponding input port 341 of switch device 340. This twist in fiber 317 converts the light waves with the TE component of radiation at its input end to light waves with the TM component of radiation at its output end, and enters switch device 340 through input port 341 with the proper polarization. Since at this juncture, both switch devices have the proper polarization of light presented thereto, this light in each switch device will be routed correctly and efficiently therethrough and will emerge from the desired output of the switch device with the same polarization it had before entering each switch device. For connecting the fibers 316 through 319, keyed fiber connectors are required for mating each of the fibers to the other optical components in the proper orientation. These fiber connectors are available from Radiall as Model Nos. 717-015-00 (plug) and 716-70-00 (adapter).

The switching devices 330 and 340 respectively switch the incoming light waves at input ports 331 and 341 to the output ports associated with another then selected one of the PBXs (or the BPN 14) for receiving communication signals at these output ports. At the same time, the incoming light waves of the PBX receiving signals from input ports 331 and 341 respectively provide its communication signals to the output ports 332 and 342, as determined by the control unit 350. As described earlier herein with reference to FIG. 2, a bidirectional connection between PBXs is achieved.

The light from switch devices 330 and 340 are combined in the polarizing combiner 320. Light waves emerge from the output port 342 from switch device 340 with the TM component of radiation just as it entered. High birefringence fiber 319 connects this output port to an input port 321 of the polarizing combiner 320. Also connected to the polarizing combiner 320 is the high birefringence fiber 318 which connects the output port 332 of switch device 330 to input port 322. This fiber 318 is twisted through 90° before being connected to the combiner 320, to ensure that the light waves having the TM component of radiation at the input end of the fiber will appear as light waves with a TE component of radiation at the output end of the fiber.

The polarizing combiner 320 optically joins the two polarized light wave signals at its two inputs into a single light wave signal at its output port which is provided to a PBX via the single-mode fiber 306. By orthogonally combining the TM and TE components of the optical signal, potential interference effects between the two components are avoided. The combined signal has the same arbitrary polarization and approximately the same signal strength as the original incoming optical signal on a single-mode fiber. As the polarization of the incoming light waves varies, more or less of the optical signal will pass through the path provided by switch device 330 or the path provided by switch device 340, but the total amount of light through both switching devices will remain relatively constant. The optical lengths of both paths are closely matched to minimize the difference in propagation times for the TE component and the TM component. By minimizing these optical path length differences, the maximum bit rate which otherwise can be passed through the optical switch is not degraded.

Various other modifications of this invention are contemplated and may obviously be resorted to by those skilled in the art without departing from the spirit and scope of the invention as hereinafter defined by the appended claims.

We claim:

1. An apparatus for providing a polarization independent optical switch comprising:
   means for splitting arbitrary polarized light waves into a first TE radiation component and a first TM radiation component;
   first converting means connected to the splitting means for converting the first TE radiation component into a second TM radiation component;
   photonic switching means for switching both the first and second TM radiation components, the switching means receiving both the first and second TM radiation components at a pair of input ports and routing both switched first and switched second TM radiation components to a pair of output ports;
   second converting means connected to the switching means for converting the switched first TM radiation component into a switched TE radiation component; and
   means connected to the switching means and second converting means for combining the switched second TM radiation component and the switched TE radiation component into arbitrary polarized light waves.

2. The apparatus of claim 1 wherein the first converting means includes a high birefringence fiber.

3. The apparatus of claim 2 wherein the first converting means further comprises first connecting means, the first connecting means including both means for connecting the high birefringence fiber to the splitting means and means for rotating the birefringence fiber 90 degrees before connecting said fiber to a first one of the pair of input ports of the photonic switching means.

4. The apparatus of claim 3 further comprising second connecting means, the second connecting means including a high birefringence fiber for interconnecting the splitting means and the photonic switching means, the second connecting means coupling the first TM radiation component from the splitting means to a second one of the pair of input ports of the photonic switching means.

5. The apparatus of claim 4 further comprising an optical link for receiving the arbitrary polarized light waves.

6. The apparatus of claim 5 wherein the optical link comprise a single mode fiber.

7. The apparatus of claim 1 wherein the second converting means includes a high birefringence fiber.

8. The apparatus of claim 7 wherein the second converting means further comprises first connecting means, the first connecting means including both means for connecting the high birefringence fiber to a first one of the pair of output ports of the switching means and means for rotating the birefringence fiber 90 degrees before connecting said fiber to the combining means.

9. The apparatus of claim 8 further comprising second connecting means, the second connecting means including a high birefringence fiber for interconnecting the photonic switching means and the combining means, the second connecting means coupling the switched second TM radiation component from a second one of the pair of output ports of the photonic switching means to the combining means.

10. The apparatus of claim 1 further comprising control means connected to the photonic switching means, the control means controlling the selecting of the pair of output ports for routing the switched first and switched second TM radiation components.

11. The apparatus of claim 10 wherein the photonic switching means comprises multiple pairs of input ports for receiving both the first and second TM radiation components of each of a plurality of arbitrary polarized light waves, and multiple pairs of output ports for receiving both the switched first and switched second TM radiation components of each of the plurality of arbitrary polarized light waves.

12. The apparatus of claim 11 wherein the photonic switching means further comprises means, responsive to the control means, for respectively routing each of switched first and switched second TM radiation components for each of the plurality of arbitrary polarized light waves to a selected one of the multiple pairs of output ports.

13. An apparatus for providing a polarization independent optical switch comprising:
    means for splitting arbitrary polarized light waves into a first TE radiation component and a first TM radiation component;
    first converting means connected to the splitting means for converting the first TE radiation component into a second TM radiation component;
    photonic switching means for switching both the first and second TM radiation components, the switching means receiving both the first and second TM radiation components at a pair of input ports and routing both switched first and switched second TM radiation components to a pair of output ports;
    second converting means connected to the switching means for converting the switched second TM radiation component into a switched TE radiation component; and
    means connected to the switching means and second converting means for combining the switched first TM radiation component and the switched TE radiation component into arbitrary polarized light waves.

14. An apparatus for providing a polarization independent optical switch comprising:
    means for splitting arbitrary polarized light waves into a first radiation component and a second radiation component orthogonal to the first radiation component;
    first converting means connected to the splitting means for converting the first radiation component into a third radiation component orthogonal to the first radiation component;
    photonic switching means for switching both the second and third radiation components, the switching means receiving both the second and third radiation components at a pair of input ports and routing both the second and third radiation components to a pair of output ports as switched first and switched second radiation components;
    second converting means connected to the switching means for converting the switched first radiation component into a switched third radiation component orthogonal to the switched first radiation component; and
    means connected to the photonic switching means and second converting means for combining the switched second radiation component and the switched third radiation component into arbitrary polarized light waves.

15. A method of providing a polarization independent optical switch comprising the steps of:
    splitting arbitrary polarized light waves into a first TE radiation component and a first TM radiation component;
    converting the first TE radiation component into a second TM radiation component;
    switching both the first and second TM radiation components in a photonic switch, the first and second TM radiation components being received by the photonic switch at a pair of input ports on the photonic switch and the switching step routing both the first and second TM radiation components to a pair of output ports on the photonic switch as switched first and switched second TM radiation components;
    converting the switched first TM radiation component into a switched TE radiation component; and
    combining the switched second TM radiation component and the switched TE radiation component into arbitrary polarized light waves.

16. The method of claim 15 wherein the converting step for converting the first TE radiation component into a second TM radiation component includes a first high birefringence fiber.

17. The method of claim 16 wherein the converting step for converting the first TE radiation component into a second TM radiation component further comprises the steps of launching the first TE radiation component into a first end of the first high birefringence fiber and rotating the first high birefringence fiber 90 degrees for obtaining the second TM radiation component at a second end of said first high birefringence fiber.

18. The method of claim 17 further comprising the step of coupling the first TM radiation component to the photonic switch, the coupling step including the step of launching the first TM radiation component into a first end of a second high birefringence fiber for maintaining the first TM radiation component at a second end of said second high birefringence fiber.

19. The method of claim 15 wherein the converting step for converting the switched first TM radiation component into a switched TE radiation component includes a first high birefringence fiber.

20. The method of claim 19 wherein the converting step for converting the switched first TM radiation component into a switched TE radiation component further comprises the steps of launching the switched first TM radiation component into a first end of the first high birefringence fiber and rotating the first high birefringence fiber 90 degrees for obtaining the switched TE radiation component at a second end of said first high birefringence fiber.

21. The method of claim 20 further comprising a polarizing combiner wherein the switched second TM radiation component and the switched TE radiation component are combined into arbitrary polarized light waves in said combiner by the combining step.

22. The method of claim 21 further comprising the step of coupling the switched second TM radiation component to the polarizing combiner, the coupling step including the step of launching the switched second TM radiation component into a first end of a second high birefringence fiber for maintaining the switched second TM radiation component at a second end of said second high birefringence fiber.

* * * * *